(12) United States Patent
Anselmi (10) Patent No.: US 9,185,972 B2
(45) Date of Patent: Nov. 17, 2015

(54) KITCHEN HOB

(75) Inventor: Ettore Anselmi, Boretto (RE) (IT)

(73) Assignee: PRAMAR S.R.L. (IT)

( * ) Notice: Subject to any disclaimer, the term of this patent is extended or adjusted under 35 U.S.C. 154(b) by 350 days.

(21) Appl. No.: 13/978,917

(22) PCT Filed: Jan. 2, 2012

(86) PCT No.: PCT/IT2012/000001
§ 371 (c)(1),
(2), (4) Date: Aug. 9, 2013

(87) PCT Pub. No.: WO2012/095880
PCT Pub. Date: Jul. 19, 2012

(65) Prior Publication Data
US 2013/0306053 A1 Nov. 21, 2013

(30) Foreign Application Priority Data

Jan. 11, 2011 (IT) .............................. MO2011A0003

(51) Int. Cl.
| A47J 31/00 | (2006.01) |
| A47B 77/08 | (2006.01) |
| F24C 3/08 | (2006.01) |
| F24C 15/10 | (2006.01) |
| B23P 19/00 | (2006.01) |

(52) U.S. Cl.
CPC ................. *A47B 77/08* (2013.01); *B23P 19/00* (2013.01); *F24C 3/085* (2013.01); *F24C 15/10* (2013.01); *Y10T 29/49826* (2015.01)

(58) Field of Classification Search
CPC .................................. A47B 77/08; B23P 19/00

USPC ................................ 126/214 A, 39 E; 29/428
See application file for complete search history.

(56) References Cited

U.S. PATENT DOCUMENTS

| 5,036,831 A * | 8/1991 | Ray ............................... 126/211 |
| 5,640,947 A * | 6/1997 | Shute ............................ 126/211 |
| 7,895,999 B2 * | 3/2011 | Graham et al. ................ 126/215 |
| 2007/0145032 A1 | 6/2007 | Graham et al. |
| 2008/0289617 A1 | 11/2008 | Graham et al. |

(Continued)

FOREIGN PATENT DOCUMENTS

| BR | 9601448 A | 11/1998 |
| CN | 2386346 Y | 7/2000 |

(Continued)

OTHER PUBLICATIONS

ABK Innovent: "i-cooking leaflet", XP002660363, dated Aug. 1, 2010; retrieved from the internet at URL:http://www.i-cooking.eu/downloads/leaflets/i-Cooking_leaflet_NL.pdf on Sep. 29, 2011.

(Continued)

*Primary Examiner* — Gregory Huson
*Assistant Examiner* — Nikhil Mashruwala
(74) *Attorney, Agent, or Firm* — Hershkovitz & Associates PLLC; Abe Hershkovitz (57) ABSTRACT

The hob (1) comprises at least one support element (2), defining at least one visible surface (2a) intended to be facing upwardly and at least one laying surface (2b) intended to be facing downwardly, which can be placed onto a bearing structure (L) and made of material coming from at least one natural stone and comprising at least one reinforcement slab (3) integrally associated with the laying surface (2b).

20 Claims, 6 Drawing Sheets

(56) References Cited

U.S. PATENT DOCUMENTS

2012/0152231 A1* 6/2012 Van Der Sluis et al. .... 126/39 E
2015/0201465 A1* 7/2015 Adelmann et al. ........ 126/214 A

FOREIGN PATENT DOCUMENTS

| EP | 0 969 253 A2 | 1/2000 |
| WO | WO 96/25630 A1 | 8/1996 |
| WO | WO 2006/006881 A1 | 1/2006 |
| WO | WO2010/143952 A1 | 12/2010 |

OTHER PUBLICATIONS

International Search Report issued in PCT Application No. PCT/IT2012/000001 dated May 21, 2012.
English language Abstract for CN 2386346Y.
Office Action mailed on Dec. 29, 2014 in the counterpart Chinese Patent Application No. 201280004524.7.

* cited by examiner

KITCHEN HOB

The present invention refers to a kitchen hob.

Known type kitchens include a working plane, usually called "top", made of natural stone, such as marble, granite, agglomerated materials, for example okite, etc, onto which a hob is applied provided with a plurality of elements which can be heated, generally defined as "fires".

The hob of the kitchens of known type is inserted inside a breaking defined in the top and is usually made of steel.

Due to aesthetic reasons the use of cooking surfaces made of natural stone or similar has recently spread. More specifically, nowadays the hobs thus made are integrally defined fully in working plane, that is in the top.

This type of implementation of the hobs presents, however, some drawbacks.

Indeed, the production of a hob built-in in the top of a kitchen turns out to be remarkably expensive for the particular and difficult works which must be performed. It is known to the technician of the field that the transport and execution of cutting processes of natural stone slabs usually having a small thickness compared to the other dimensions are particularly complex and require long execution times.

The high cost of production of the hobs with natural stone made in single piece with the top allows its purchase to a limited number of users.

Moreover, this type of hobs must be tailor-made, that is on the basis of the shape and sizes of the kitchen of the customer, therefore these hobs cannot be applied on yet existing tops. It follows, therefore, that the scope of application of the hobs thus made is considerably limited.

The main task of the present invention is to devise a kitchen hob which allows to keep the aesthetic effect of the hobs built-in in the top of a kitchen and which has, at the same time, a lower cost and more flexible use.

In particular, a purpose of the present invention is to provide a hob which can be applied even on yet existing top and which can be thus used to replace a common hob made of steel.

Another purpose of the present invention is to create a hob which can be easily integrated with a top made of natural stone, conglomerate or similar even by the manufacturer of the top itself.

Yet another purpose of the present invention is to devise a hob which has a construction and transport simpler and easier than the hobs made in single piece with the top of the kitchen.

A last but mot least purpose of the present invention is to provide a hob which has mechanical strength features at least equal to those ones of the hobs of known type.

Another purpose of the present invention is to indicate a kitchen hob which allows to overcome the mentioned drawbacks of the prior art within the circle of a simple, rational solution of easy and efficient use and with a reduced cost.

The purposes exposed above are achieved by the present hob, characterized in that it comprises:
- at least one support element which can be positioned onto a bearing structure and made of a material coming from at least one natural stone, said support element defining at least one visible surface, intended to be facing upwardly, and at least one laying surface, intended to be facing downwardly;
- and at least one reinforcement slab integrally associated with said laying surface.

Other features and advantages of the present invention will be more apparent from the description of a preferred, but not exclusive, embodiment of a kitchen hob, illustrated by indicative, but not limiting, way in the appended drawing tables in which.

With particular reference to these figures, a hob for kitchens is globally indicated with the reference number 1.

According to the invention, the hob 1 includes at least one support element 2 made of a material coming from a natural stone and at least one reinforcement slab 3 integrally associated with the support element 2.

The support element 2 is positioned on an existing bearing structure L defining what in jargon is called "kitchen top" or "kitchen plane". The bearing structure L is then suitable to support the hob 1 and includes at least one rest element P defining a rest plane P' facing upwardly in use and provided with at least one breaking S.

The support element 2 defines a visible surface 2a, intended to be facing upwardly, and a laying surface 2b, intended to be facing downwardly or towards the bearing structure.

Figure 1:
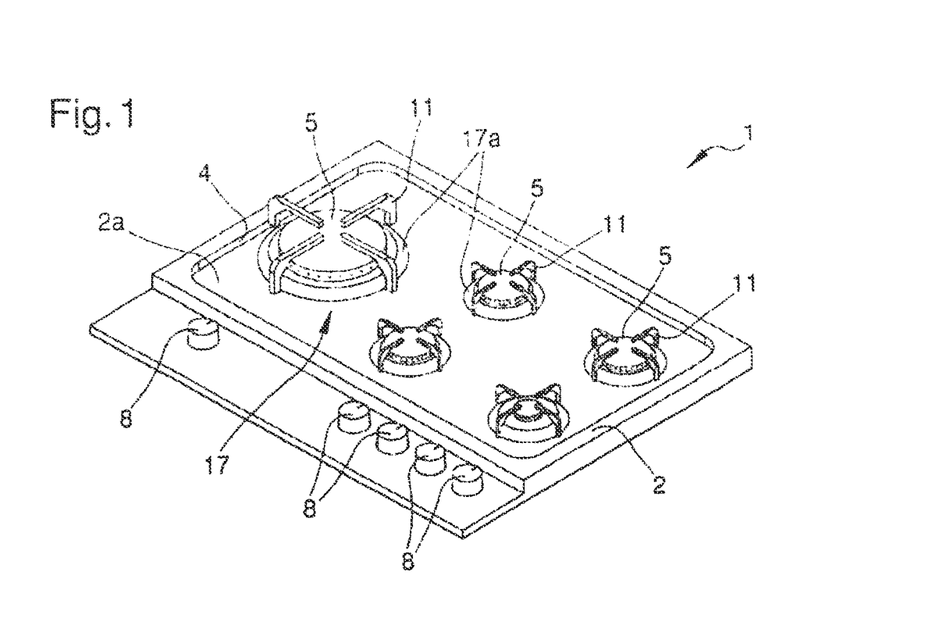
FIG. 1 is an assonometric view of a hob according to the invention in a first embodiment.
Figure 2:
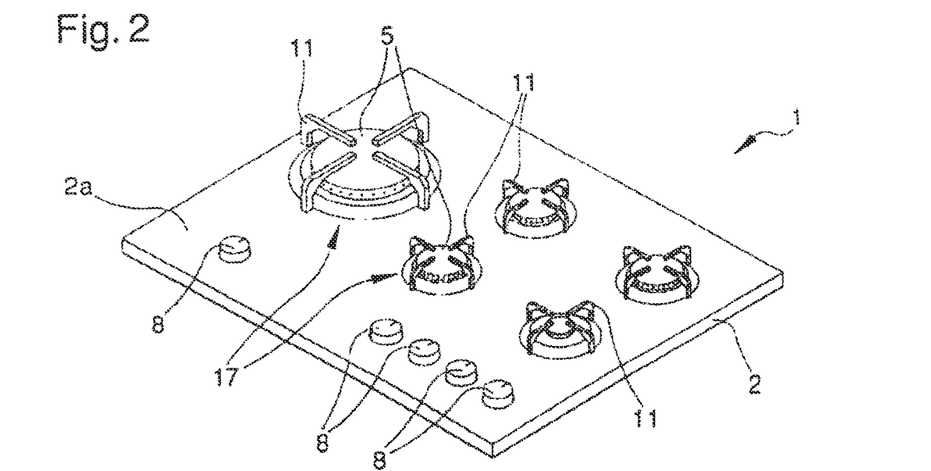
FIG. 2 is an assonometric view of a hob according to the invention in a second embodiment.
Figure 3:
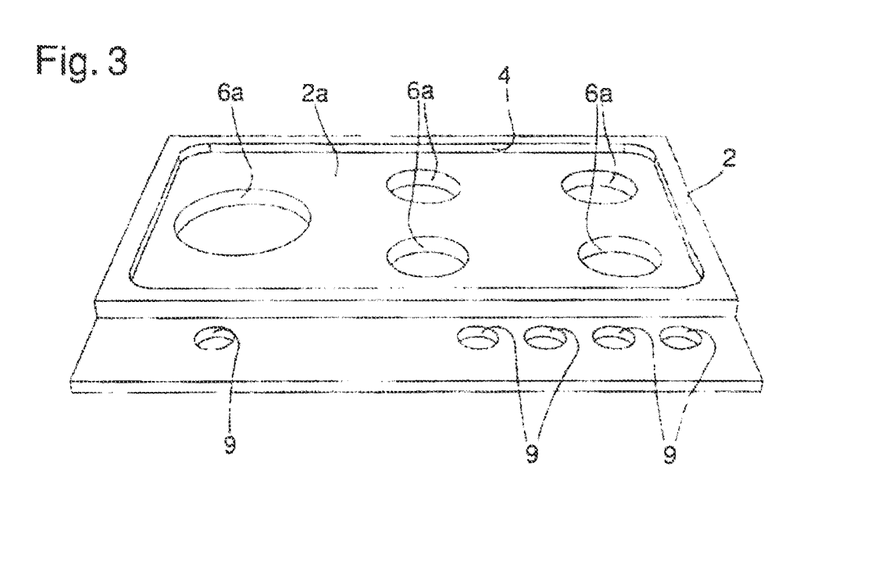
FIG. 3 is an assonometric view of the supporting element of the hob of FIG. 1.
Figure 4:
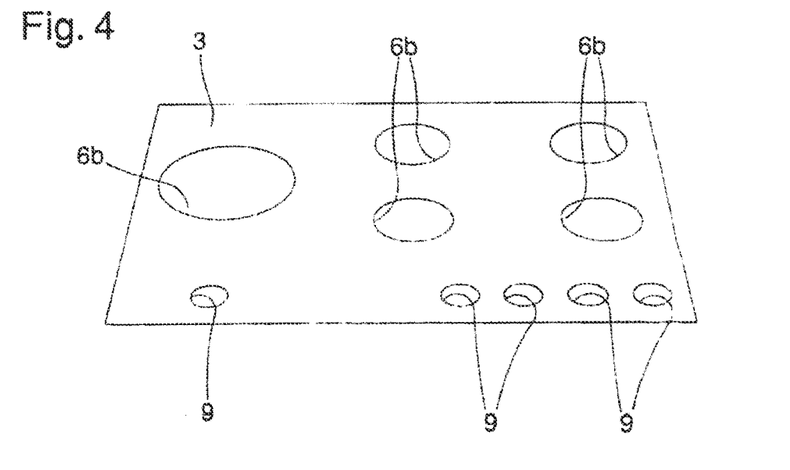
FIG. 4 is an assonometric view of the reinforcement slab of the hob of FIG. 1.
Figure 5:
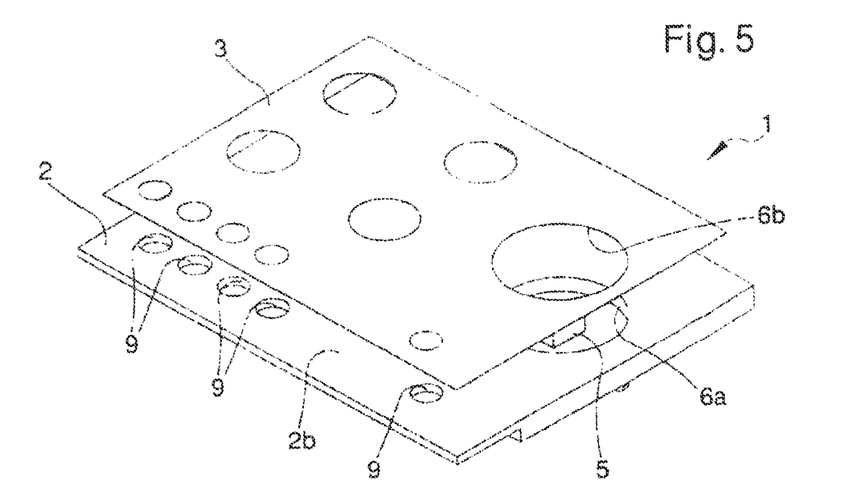
FIG. 5 is a representation of the application phase of the reinforcement slab of FIG. 4 to the support element of FIG. 3.

The support element 2 can have several conformations. For example, it could be slab-shaped, as shown in the embodiment of FIG. 2, or it may have a raised edge 4 to limit the visible surface 2a, as shown in the embodiment of FIG. 1.

Properly, the support element 2 has thickness between 20 mm and 60 mm. More particularly, the thickness of the support element 2 varies depending on the mode of application of the hob to the bearing structure L.

Advantageously, the support element 2 is made of a material selected from the group consisting of: natural stones, such as marble and granite, and natural stones agglomerates, manufactured for instance through industrial processes, such as Okite®.

According to the invention, the reinforcement slab 3 is associated with the laying surface 2b of the support element 2.

Preferably, the reinforcement slab 3 is of metallic type, for example made of AISI 304 stainless steel. Different embodiments in which the reinforcement slab 3 is made of non-metallic materials, are, however, not excluded.

Appropriately, the reinforcement slab 3 is integrally associated with the support element 2 by means of adhesives.

The reinforcement slab 3 is intended to rest on the bearing structure L.

The hob 1, then, includes one or more elements which can be heated 5, commonly defined as "fires", facing the visible surface 2a and suitable to provide heat to a pot or the like.

In the embodiments shown in the figures, the elements which can be heated 5 are of the gas burners type, but alternative embodiments in which they are of electric or induction type are not excluded.

The hob 1 comprises at least an opening 6 passing through the support element 2 and the reinforcement slab 3 for the insertion and housing of a corresponding element which can be heated 5.

More in detail, at least one first through notch 6a and at least one second through notch 6b, aligned each other in order to define a respective opening 6, are defined, respectively, on the support element 2 and the reinforcement slab 3.

In the embodiments shown in the figures, the openings 6 have substantially circular shape and the diameter of the second notches 6b is equal to or greater than the first notches 6a.

A corresponding element which can be heated 5 is inserted into each opening 6.

Advantageously, the hob 1 comprises lower locking means 7 of at least one of the elements which can be heated 5 along at least a first direction. The lower locking means 7 are of removable type.

More particularly, the lower locking means 7 comprise at least one bracket 7a resting against at least one between the support element 2 and the reinforcement slab 3, from the opposite side with respect of the visible surface 2a, and mutual connection means 7b of the bracket 7a to the related element which can be heated 5.

Figure 6:
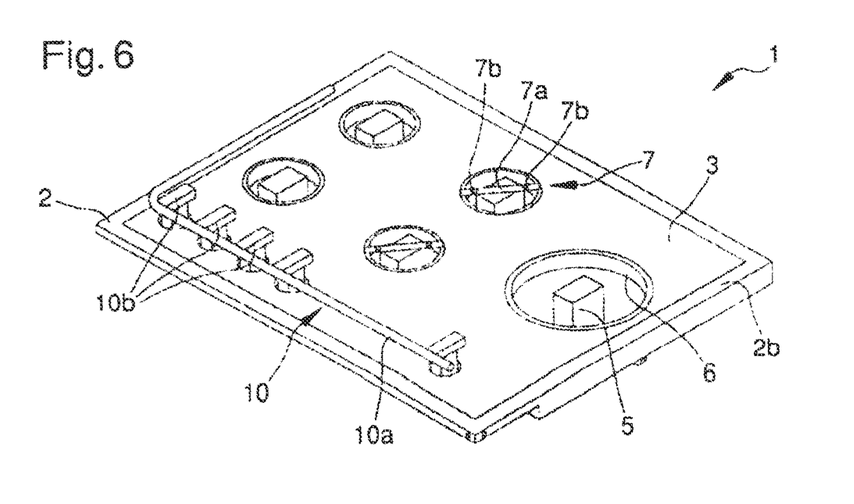
FIG. 6 is an assonometric view of the supply means of the hob of FIG. 1.

As it can be seen in FIG. 6, the bracket 7a is placed in such a way as to contact with its ends two opposite areas opposite each other of the edge delimiting the respective first or second notch 6a, 6b, in order to cross the ideal extension of the opening 6 defined by them.

The lower locking means 7 are thus suitable to prevent the lifting of the related element which can be heated 5 through the visible surface 2a.

Appropriately, the bracket 7a is made of metallic material, in such a way that to allow earthing of the other metallic parts in contact with it.

The hob 1, then, includes also upper locking means 17 of at least one element which can be heated 5 along at least one second direction substantially opposite to the first direction mentioned above.

More specifically, the upper locking means 17 comprise at least one blocking element 17a integrally connected with the related element which can be heated 5, for instance screw connection means 17b, and suitable to rest against the visible surface 2a in order to prevent removal of the related element which can heated 5 through the laying surface 2b.

Figure 7:
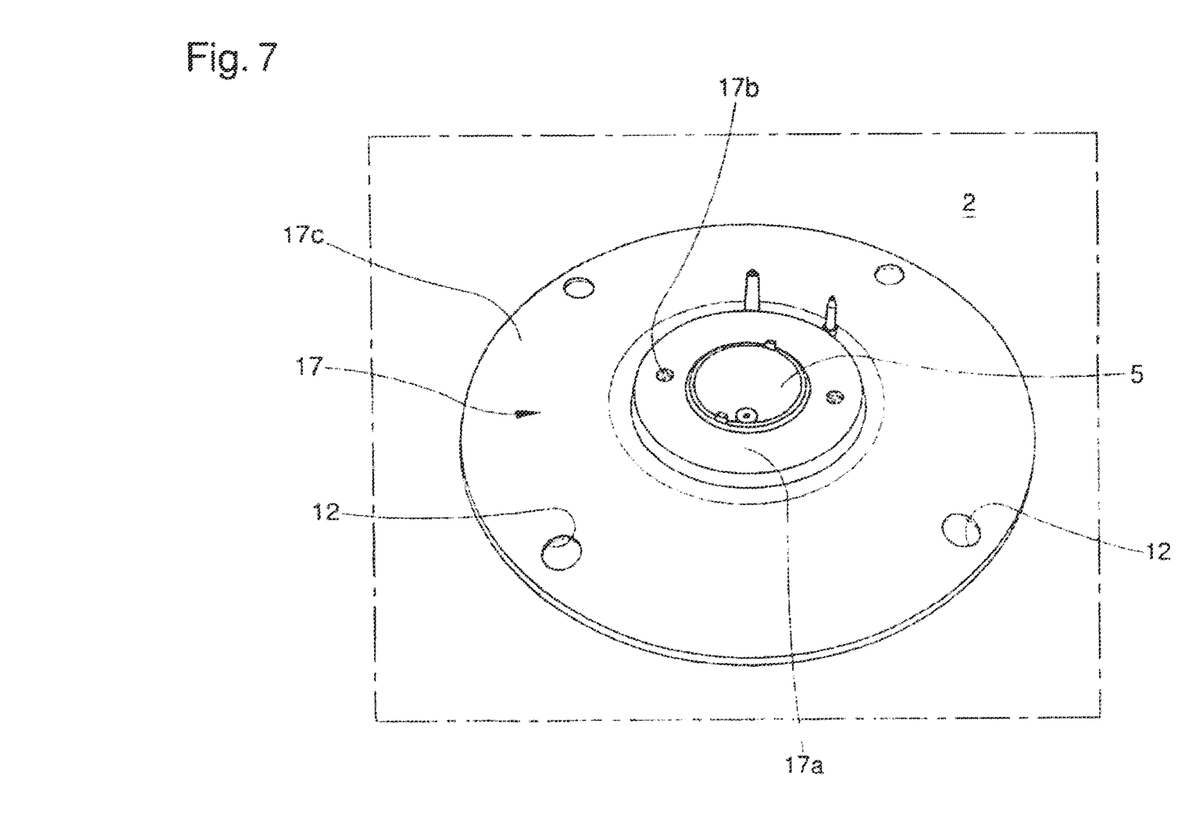
FIG. 7 is an enlargement of a detail of the hob of FIG. 2.

As in the embodiment shown in FIG. 7, the upper locking means 17 may also comprise an intermediate element 17c interposed between the blocking element 17a and the visible surface 2a.

In the embodiment of FIG. 7, the blocking element 17a therefore rests against the visible surface 2a through the intermediate element 17c.

Advantageously, the upper blocking means 17 include at least one raised holding element, not visible in detail in the figures, fixed to the visible surface 2a, for example by gluing, and defining a strike surface suitable to prevent displacement of the blocking element 17a along the visible surface 2a.

The holding element, for instance circular crown-shaped and arranged so as to surround the edge delimiting the opening 6 defined in the visible surface 2a, is therefore suitable to keep in the correct position the holding element 5, preventing its displacements along the directions transverse to the first and second directions.

The hob 1 also includes control means 8 of the elements which can be heated 5, for instance one or more rotating knobs, accessible from the outside.

More particularly, at least one between the support element 2 and the reinforcement slab 3, preferably both, includes one or more holes 9 for passing the control means 8.

In the embodiment shown in FIG. 6, the hob 1 also comprises supply means 10 of the elements which can be heated 5, for example consisting of a gas supply circuit.

Advantageously, the supply means 10 are integrally associated with the reinforcement slab 3 from the opposite side with respect to the support element 2.

These supply means 10 are for instance constituted by at least one pipe 10a for the passage of gas and by a plurality of valves 10b operatively connected with the control means 8 of the elements which can be heated 5. It is obvious to the technician in the industry to understand that, if the elements which can be heated 5 are of electric type, the supply means 10 will comprise conductive elements, such as copper cables, as well as some switches, energy regulators, thermostats, etc.

The supply means 10 may then be covered by a protection carter 13 fixed to the reinforcement slab 3.

The supply means 10 are intended to be inserted into the breaking S defined by the bearing structure L and in use, therefore, they are not visible from the outside.

The hob 1, then, comprises one or more supporting elements 11 of a pot or the like resting on the visible surface 2a at a related element which can be heated 5.

Properly, the hob 1 also includes centering means 12 of the supporting elements 11 shaped in such a way as to allow their correct positioning with respect to the related element which can be heated and prevent them from rotating.

Preferably, the centering means 12 include one or more housing seats of corresponding protrusions defined on the related supporting element 11 and not visible in detail in the figures. Seats 12 are then suitable to prevent rotation of the related supporting element 11 around an axis incident the visible surface 2a.

More in particular, the seats 12 are defined on the blocking element 17a or the intermediate element 17c, as shown by FIG. 7.

The present invention also refers, therefore, to kitchen furniture provided with a bearing structure L, including at least one rest element P which defines at least one rest plane P' and presents at least one breaking S, and with a hob 1, comprising the support element 2 and the reinforcement slab 3 according to what just described above, which is applied to the bearing structure L at the breaking S.

The hob 1 can be positioned so that the reinforcement slab 3 rests on the rest plane P' and the visible surface 2a is raised above the rest plane itself, as in the embodiment of FIG. 1, or in such a way that the visible surface 2a is substantially coplanar with the rest plane P'.

Figure 9:
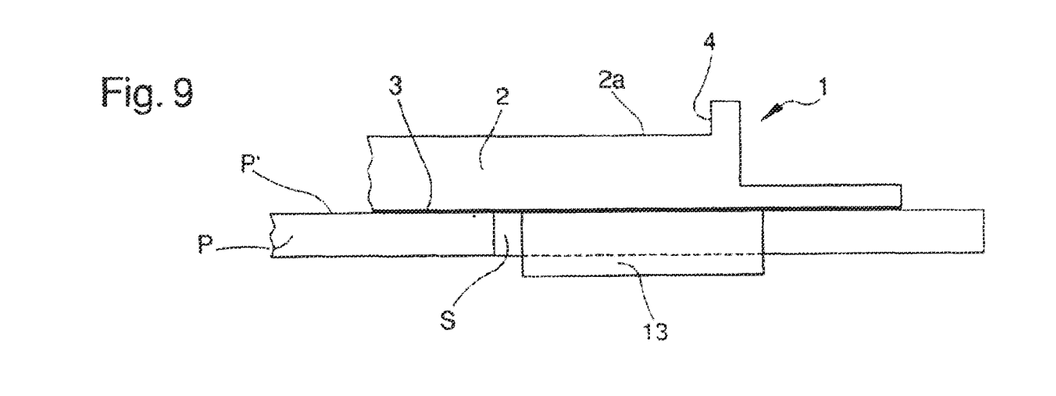
FIG. 9 is a section view of a kitchen furniture comprising the hob of FIG. 1.

In the first case, shown in FIG. 9, the bearing structure L presents only one breaking S, inside which the supply means 10 of the elements which can be heated 5 are inserted and the reinforcement slab 3 rests, as mentioned, on the rest plane P'.

Figure 8:
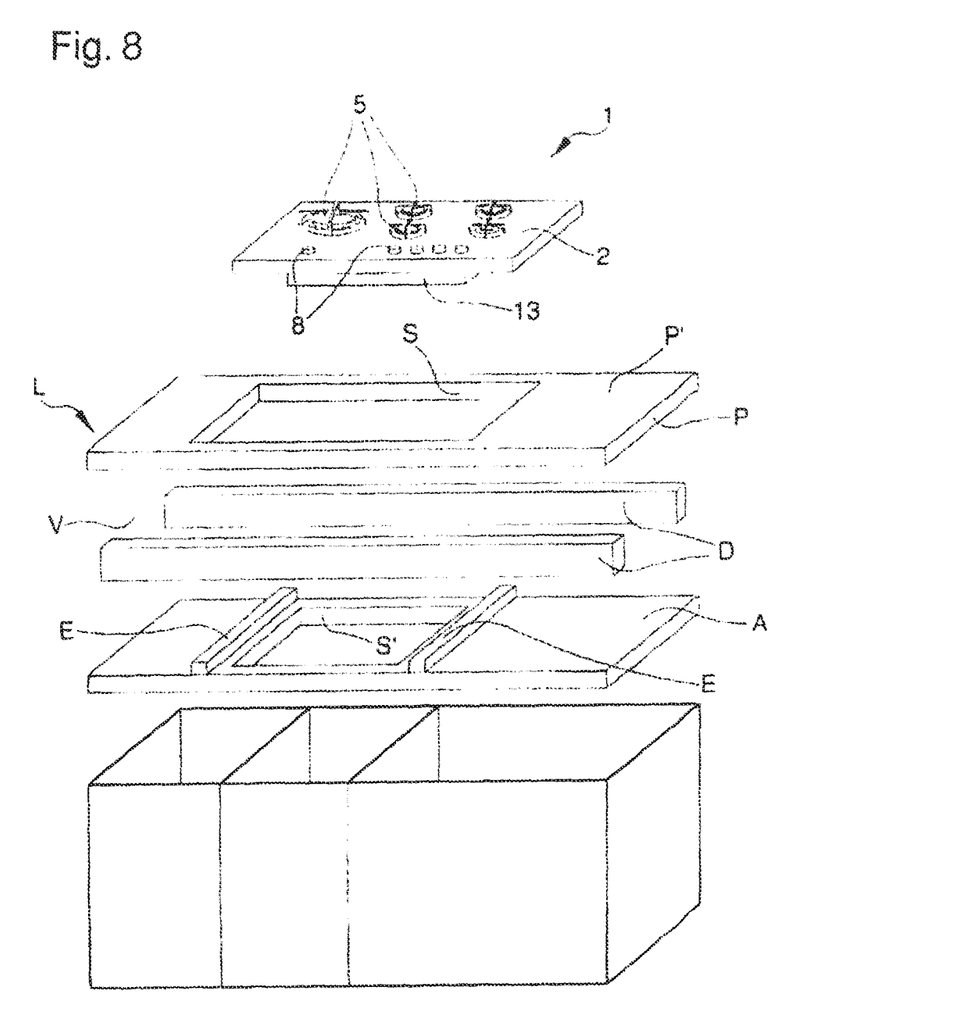
FIG. 8 is an exploded view of a kitchen furniture comprising the hob of FIG. 2.
Figure 10:
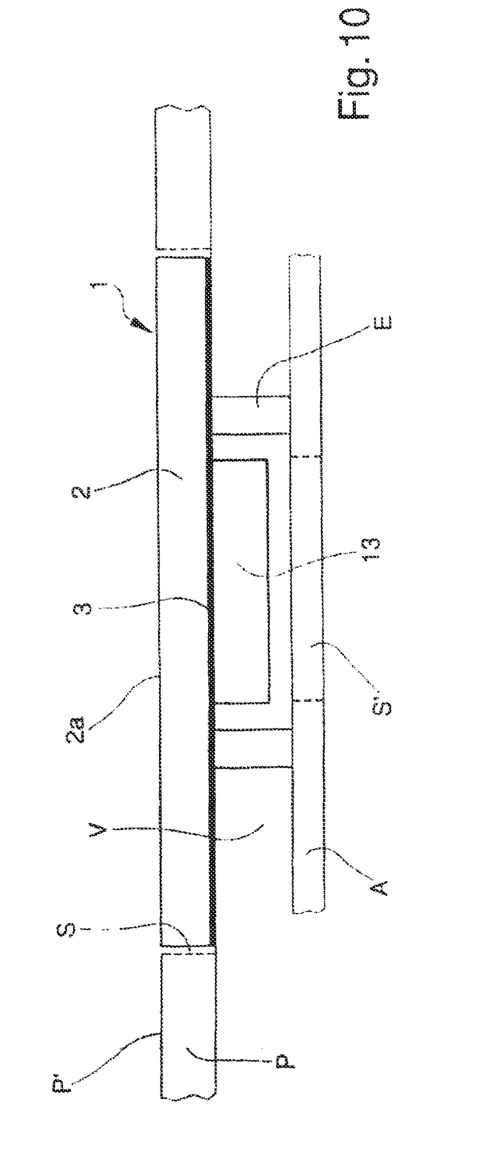
FIG. 10 is a section view of a kitchen furniture comprising the hob of FIG. 2.

In the second case, shown in FIGS. 8 and 10, the bearing structure L includes an auxiliary component A placed below the rest element P in order to define an intermediate compartment V inside which the supply means 10 are inserted.

The bearing structure L presents a breaking S defined on the rest element P and within which the support element 2 and the reinforcement slab 3 insert so that the visible surface 2a is substantially coplanar with the rest plane P' and a further breaking S' defined on the auxiliary component and suitable to allow access to the supply means. Preferably, the breaking S is larger than the further breaking S'.

Appropriately, some spacers D and some carriers E, on which the reinforcement slab 3 rests, are interposed between the rest element P and auxiliary component A.

The process for the construction of a hob according to the invention is described in the following.

Firstly it is arranged for a bearing structure L to e provided that includes a rest element P, intended to receive the hob 1, which defines a rest plane P' facing upwardly and presents at least one breaking S. Such a bearing structure, then, defines what in jargon is called "kitchen plane" or "kitchen top". The bearing structure, not represented in the figures, may be then of new construction or yet existing.

It is, then, arranged for a support element 2 and a reinforcement slab 3 to be provided having the features described above and to make these two elements integral each other in order to define a hob 1.

The hob 1 may include one or more of the features described above.

More particularly, before making the support element 2 and the reinforcement slab 3 integral each other, one or more first through notches 6a and one or more second through notches 6b for the insertion of the elements which can be heated 5, and one or more through holes 9 for the insertion of the control means 8 of the elements which can be heated 5 themselves are made, respectively, on them.

The support element 2 is suitably shaped according to the type of application it is desired to get. In particular, the support element 2 may be step-shaped, as shown in FIGS. 1 and 9, for example if it is intended to be rested above the rest plane P' or it may be slab-shaped, for example if it should be embedded into the bearing structure L so that the visible surface 2a is substantially coplanar with the rest plane P as shown in FIGS. 2, 8 and 10.

Once sizes and, then, the external encumbrance of the support element 2 and the reinforcement slab 3 have been defined, it is arranged for them to be made integral each other, for instance by using some gluing substances, in such a way to align each first notch 6a to a respective second notch 6b so as to define some respective apertures 6 passing through the support element 2 and the reinforcement slab 3.

After performing the phase of making integral, the elements which can be heated 5 are inserted inside the openings 6, the holding elements are fixed to the visible surface 2a and the locking means 7 and 17 are applied to the elements which can be heated 5. More in detail, the brackets 7a and the blocking elements 17a are respectively fixed to the lower end and the upper end of each element which can be heated 5, so as to prevent the removal thereof.

Properly, it is arranged for the supply means 10 to be associated with the reinforcement slab 3 and to be connected with the elements which can be heated 5. As previously anticipated, the hob 1 thus obtained can then be positioned on the bearing structure L according two different modes.

The first positioning mode provides for the insertion of the supply means 10 into the breaking D and the application of the reinforcement slab 3 onto the rest plane P. In this case, therefore, the visible surface 2a is at a height different from the rest plane P'.

In order to perform the second positioning mode of the hob 1 onto the bearing structure L, the latter must be provided, beyond the rest element P, also with an auxiliary component A arranged below the rest element itself in order to define a compartment V interposed between them. In addition, another breaking S' is properly defined in the auxiliary component A in order to ease access to the supply means 10.

More specifically, the positioning occurs by inserting the supply means 10 inside the compartment V and the assembly formed by the support element 2 and the reinforcement slab 3 inside of the breaking S in such a way that the visible surface 2a is substantially coplanar with the rest plane P'. The reinforcement slab 3, then, rests on the carriers E placed in the auxiliary component A at the edges of the further breaking S'.

It has been practically observed how the invention achieves the purposes proposed and in particular it is emphasized the fact that the use of a material coming from natural stones allows to get an aesthetic effect comparable to that one of hobs made in single piece with the kitchen plane and at the same time it turns out to have simpler construction and lower cost.

In addition, the hob according to the invention can be applied both to kitchen of newly installation and to existing ones, wherefore it results a wide use flexibility.

Still, the presence of the reinforcement slab gives to the hob high mechanical strength, thereby preventing the weight of the support element causes its breakage. Indeed, it would not be possible to simply apply the support element onto the breaking defined in the kitchen plane, since the support element itself would collapse under its own weight.

The invention claimed is:

1. A hob comprising:
    at least one support element which can be placed on a bearing structure and made of natural stone or an agglomerate of at least one natural stone a said support element defining at least one visible surface intended to be facing upwardly, and at least one laying surface intended to be facing downwardly;
    one or more elements which can be heated that face said visible surface;
    at least one reinforcement slab integrally associated with said laying surface; and
    one or more openings passing through said support element and said reinforcement slab for the insertion and housing of said elements which can be heated, each of said openings being defined by at least one first notch passing through said support element and by at least one second notch passing through said reinforcement slab, said at least one first notch and said at least one second notch being aligned,
    wherein a supply element of said elements which can be heated are integrally associated with said reinforcement slab, said supply element being provided from the opposite side of said support element.

2. The hob according to claim 1, further comprising a lower locking element of said elements which can be heated suitable to prevent displacement thereof with respect to at least said support element along at least one first direction.

3. The hob according to claim 2, wherein said locking element includes at least one blocking bracket suitable to rest against at least one between said support element and said reinforcement slab, from the opposite put with respect to said visible surface, and mutual connection element of said bracket with a related element which can be heated.

4. The hob according to claim 1, further comprising an upper locking element of said elements which can be heated suitable to prevent displacement thereof with respect to at least said support element along at least one second direction different from said first direction.

5. The hob according to claim 4, wherein said upper locking element includes at least one blocking element integrally associated with a related element which can be heated and suitable to rest against said visible surface and at least one raised holding element, fixed to said visible surface and defining at least one strike surface suitable to prevent the displacement of said blocking element along at least a transverse direction to said first and/or said second direction.

6. The hob according to claim 1, further comprising at least one supporting element of at least a pot or similar resting on said visible surface at least one of said elements which can be heated and a centering element of said supporting element.

7. The hob according to claim 6, wherein said centering element includes one or more housings seats of corresponding protrusions defined on the related supporting element, said seats being defined on said upper locking element.

8. The hob according claim 1, wherein said reinforcement slab is of metallic type.

9. A hob according to claim 2, further comprising upper locking element of said elements which can be heated suitable to prevent displacement thereof with respect to at least said support element along at least one second direction different from said first direction.

10. A hob according to claim 2, wherein at least one supporting element of at least a pot or similar resting on said visible surface at least one of said elements which can be heated and centering means of said supporting element.

11. A hob according to claim 2, wherein said reinforcement slab is of metallic type.

12. A hob according to claim 3, further comprising upper locking element of said elements which can be heated suitable to prevent displacement thereof with respect to at least said support element along at least one second direction different from said first direction.

13. A hob according to claim 3, wherein said reinforcement slab is of metallic type.

14. A hob according to claim 3, wherein at least one supporting element of at least a pot or similar resting on said visible surface at least one of said elements which can be heated and centering means of said supporting element.

15. A hob according to claim 4, wherein at least one supporting element of at least a pot or similar resting on said visible surface at least one of said elements which can be heated and centering means of said supporting element.

16. A hob according to claim 4, wherein said reinforcement slab is of metallic type.

17. A hob according to claim 5, wherein at least one supporting element of at least a pot or similar resting on said visible surface at least one of said elements which can be heated and centering means of said supporting element.

18. A hob according to claim 5, wherein said reinforcement slab is of metallic type.

19. A process for the construction of a kitchen furniture comprising:
providing a bearing structure comprising at least one rest element that defines at least one rest plane facing upwardly and which is provided with at least one breaking;
providing at least one support element made of a material coming from at least one natural stone and defining at least one visible surface and at least one laying surface;
providing at least one reinforcement slab;
making at least one first notch passing through said support element and at least one second notch passing through said reinforcement slab, said support element and said reinforcement slab being made integral each other so as to align each first notch to a corresponding second notch defining respective through openings;
making said reinforcement slab integral to said support element at its laying surface in order to define a hob;
inserting one or more elements which can be heated into said through openings; and
positioning said hob on said bearing structure at said breaking,
wherein said hob includes a supply element of said elements which can be heated and that said positioning phase is performed by placing said reinforcing slab onto said rest plane, said visible surface being disposed above said rest plane and inserting said supply element into said breaking.

20. The process according to claim 19, wherein said bearing structure includes at least one auxiliary component placed below said rest element so as to define an intermediate compartment between them and at least one carrier element interposed between said rest element and said auxiliary component, that said hob includes a supply element of said elements which can be heated and that said positioning phase is performed by inserting said supply elements into said compartment and said rest element into said breaking so that said visible surface is substantially coplanar with said rest plane and said reinforcement slab rests on said at least one carrier element.

* * * * *